United States Patent [19]

Bailey

[11] 4,413,349
[45] Nov. 1, 1983

[54] NON-CONTACT MEASUREMENT SYSTEM AND METHOD FOR DETERMINING THE CONTOUR OF AN ELECTRICALLY CONDUCTIVE SURFACE

[75] Inventor: Richard E. Bailey, San Diego, Calif.

[73] Assignee: General Dynamics Corporation/Convair Div., San Diego, Calif.

[21] Appl. No.: 202,796

[22] Filed: Oct. 31, 1980

[51] Int. Cl.³ .............................................. G01B 7/28
[52] U.S. Cl. .................................. 377/24; 324/61 QS
[58] Field of Search .......... 324/61 QS, 61 QL, 71 R; 356/375, 376; 235/92 DN; 33/174 P; 377/24

[56] References Cited

U.S. PATENT DOCUMENTS

| 3,221,413 | 12/1965 | Fesser | 33/174 P |
| 3,263,167 | 7/1966 | Foster et al. | 324/61 QS |
| 3,649,820 | 3/1972 | Totsuka et al. | 235/92 DN |

OTHER PUBLICATIONS

Merry et al.-Incremental Feedback Servo System—IBM Tech. Discl. Bull., vol. 12, #6, Nov. 1969.

*Primary Examiner*—Joseph A. Orsino, Jr.
*Attorney, Agent, or Firm*—John R. Duncan; Frank D. Gilliam

[57] ABSTRACT

A non-contact measurement system for determining the contour of an electrically conductive surface relative to a fixed reference point comprising a support arm journaled at one end to a bearing providing a fixed reference point and adapted to extend toward a conductive surface having a contour to be determined and a non-contact probe coupled to the support arm by a precision lead screw driven by a stepper motor which moves the probe either toward or away from the surface and which generates an electrical signal indicative of its axial position from an initial reference position. Control circuitry coupled to the stepper motor is operable to direct the stepper motor to extend the probe toward the surface until it reaches a predetermined distance from the surface. The measurement process is repeated in a plurality of positions separate from the initial position to yield data indicative of the distance from the fixed reference point to the other position points and thereby create a data representative of the contour of the surface.

An initial point may be provided separate from the conductive surface and the reference point may be placed in a plane to determine cylindrical and plane test surfaces.

10 Claims, 3 Drawing Figures

NON-CONTACT MEASUREMENT SYSTEM AND METHOD FOR DETERMINING THE CONTOUR OF AN ELECTRICALLY CONDUCTIVE SURFACE

BACKGROUND OF THE INVENTION

This invention relates to an improvement in non-contact measurement systems and methods, and more particularly, but not by way of limitation, to a method and system for determining the contour of an electrically conductive surface by a means of an electrical probe means which is brought to a predetermined position near but not touching said surface in a plurality of positions.

It has been known in the past to provide electrical systems to provide spacing between a movable member and a fixed member. In U.S. Pat. No. 3,217,204 a welding torch assembly is maintained at a fixed distance relative to a metallic workpiece by means of an electrical system that controls a driving motor coupled to the torch assembly. As the torch assembly is moved along a seam to be welded, the electrical system thus maintains the torch assembly at an optimum constant distance from the workpiece in order to achieve a good weld.

In U.S. Pat. No. 2,870,427 a device is disclosed for detecting and indicating the proximity of objects. This device utilizes an object sensing antenna which causes alteration of the output or a high frequency oscillator, and this causes production of an electrical signal which may be translated into a signal perceptible to the user.

In U.S. Pat. No. 4,107,603 an electromagnetic apparatus is disclosed for detecting propeller shaft bearing wear. As the propeller shaft rotates, an electromagnetic sensor provides a signal corresponding to the displacement of the shaft transverse to its longitudinal axis and thereby indicative of the wear of the bearing supporting the propeller shaft.

As can be seen, heretofore to the present invention, while there have been various apparatus provided for the sensing of distance of a movable member from a fixed member or to maintain such distance constant there has not been seen a non-contact measurement system and process for determining the contour of an electrically conductive surface. As an example of an application of the present invention, it is necessary at times to determine the contour of a concave electrically conductive object as a matter of determining its final contour or of determining its contour in an interim step of manufacture. Since such objects may be very fragile, contact measuring systems are not satisfactory and the instant invention provides a highly accurate means of determining the contour of an electrically conductive surface without altering the surface thereof.

SUMMARY OF THE INVENTION

Briefly stated, the present invention accomplishes its objective of determining the contour of an electrically conductive surface relative to a fixed reference point by providing a non-contact measurement system that includes a support arm journaled at one end to a bearing providing a fixed reference point and adapted to extend towards a surface having a contour to be determined. A non-contact electrical probe means is coupled to the support arm by an adjustable means adapted to move said probe means either towards or away from said surface and which generates an electrical signal indicative of its axial distance from an initial reference position. Electrical means are coupled to the non-contact means to display the distance symbolized by the electrical signal and control means are coupled to said adjustable means and are operable to direct the probe means to extend toward the surface until it reaches a predetermined distance from the surface by sensing electrical interaction of the conductive surface with the probe means.

The control means directs the adjustable means to retract the probe means to its original axial position and the support arm is positioned to a different position. The control means then directs the adjustable means to again extend the probe means toward the surface until it is a predetermined distance from said surface. The difference between the second determination and the first is then indicative of the variance of the distance of the second position from the reference point as compared to the distance determined for the initial point. The aforementioned method is then repeated as many times as may be necessary in order to obtain an accurate determination of the contour of the surface. An initial point may be provided separate from the surface in order to provide a known distance from the reference point.

The above and other specific features of the instant invention will be readily apparent as the description continues while being read in conjunction with the appended drawings.

DETAILED DESCRIPTION OF THE PREFERRED EMBODIMENT

Figure 1:
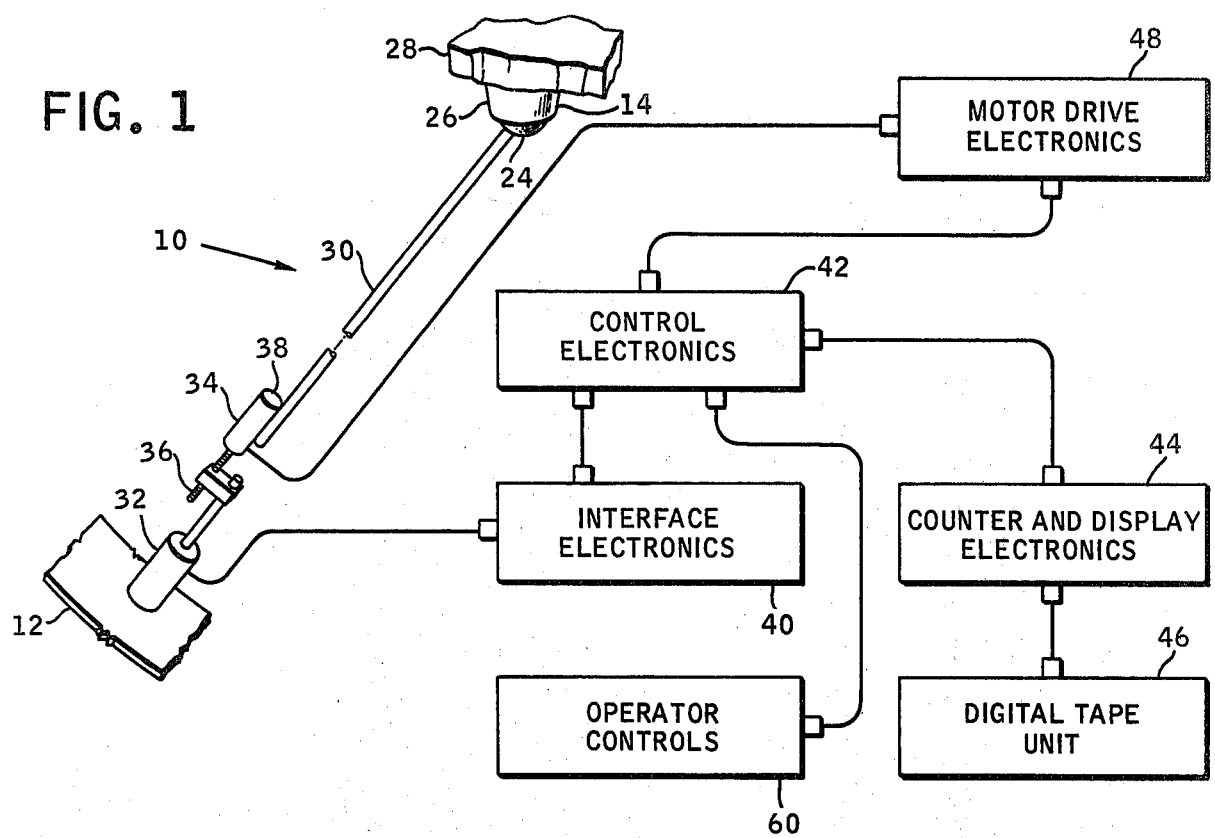
FIG. 1 is an illustrative view of the non-contact measurement system of the instant invention showing the electromechanical portion thereof relative to a conductive surface in a partial perspective view and the electronic portion thereof in a simplified block diagram.

Referring now to the drawings and more particularly to FIG. 1, reference character 10 denotes a non-contact measurement system for determining the contour of an electrically conductive surface 12 relative to a fixed reference point 14. The electrically conductive surface 12, which is shown only fragmentarily in FIG. 1 for ease of illustration, is shown in a cross sectional side elevation in FIG. 2. An example of a typical electrically conductive surface with which the subject invention may be employed is the concave surface shown in FIG. 2. Examples of materials which may comprise such a conductive surface are metals, wire mesh, graphite-epoxy surfaces, and metal foils. The invention permits the measurement of the contour of such fragile foil or mesh surfaces which would be distorted if measured by other methods, such as dial gage probes.

Figure 2:
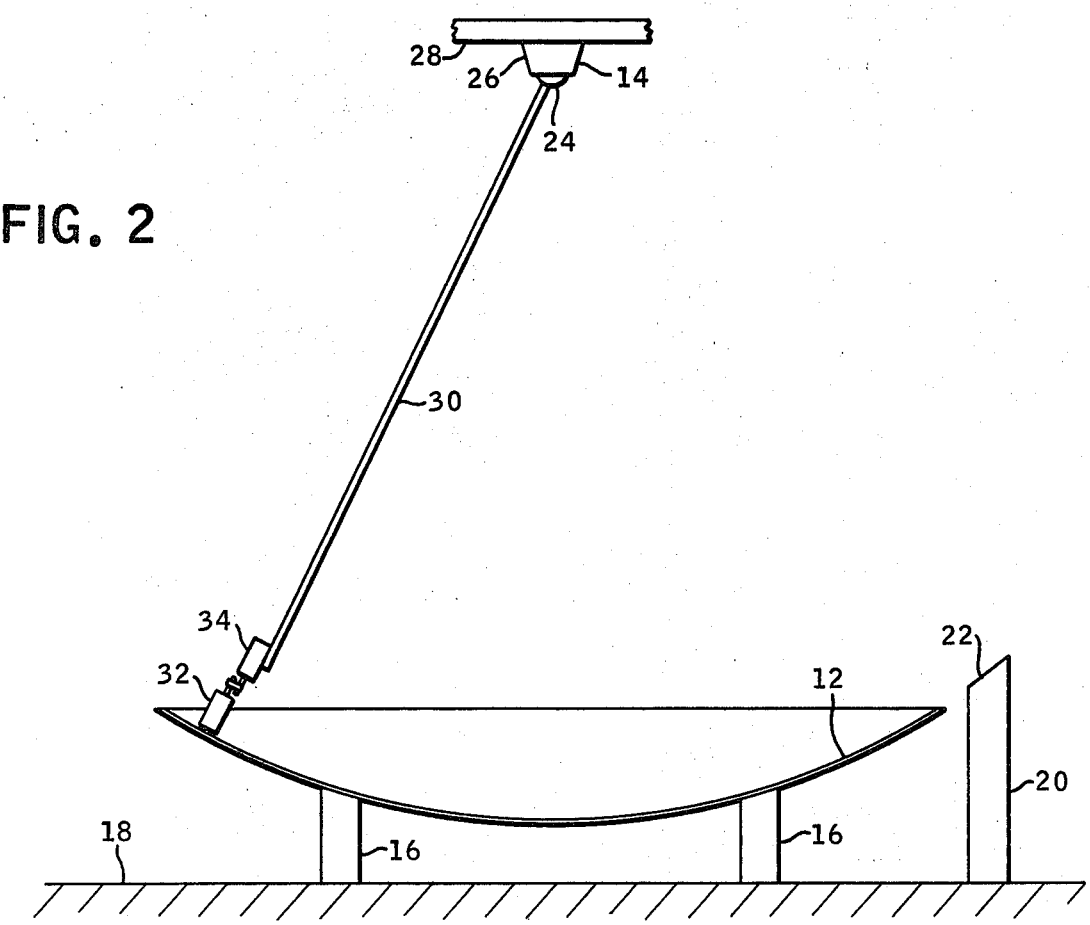
FIG. 2 is a partial side elevational view of the electromechanical portion, shown in FIG. 1, positioned relative to a cut away side view of an illustrative conductive surface, the contour of which is to be determined, and also showing an initial point which is separate from the conductive surface.

As seen in FIG. 2, the surface 12, for purposes of measurement, is supported by suitable supports 16 on a floor 18 or other surface. The contour of the surface 12 is determined with respect to a fixed reference point 14 as will be described in greater detail hereinafter. A fixed initial point separate from the conductive surface 12 may be provided by a vertically upstanding member 20 which is provided with an upper surface 22 that is preferably substantially within the same arcuate plate as the conductive surface 12.

The fixed reference point 14 is provided by a ball 24 suitably journaled within a bearing support structure 26 secured to a surface 28 fixedly spaced from the surface 12. Although the fixed reference point 14 is illustrated as a fixed single reference point for measuring spherical surfaces, it would be within the scope of this invention to mount the fixed reference point 14 in a multitude of positions within a fixed surface for measuring the contour of cylindrical or plane surfaces.

A longitudinally extending support arm 30 is secured to the ball 24 journaled in the bearing structure 26 and extends towards the surface 12. A non-contact probe means 32 is coupled to the support arm 30 by an adjustable means 34. In the illustrated embodiment of the invention, the adjustable means 34 comprises a precision lead screw 36 assembly driven by a stepper motor 38.

An electrical signal generated by the non-contact probe means is coupled through suitable interface electronics 40 to control electronics 42. The control electronics 42 is connected to a counter and display electronics 44 which in turn is connected to a digital tape unit 46. The control electronics 42 is connected to a suitable motor drive electronics 48 which in turn is connected to the stepper motor 34. Suitable operator controls 60 are connected to the control electronics 42.

Figure 3:
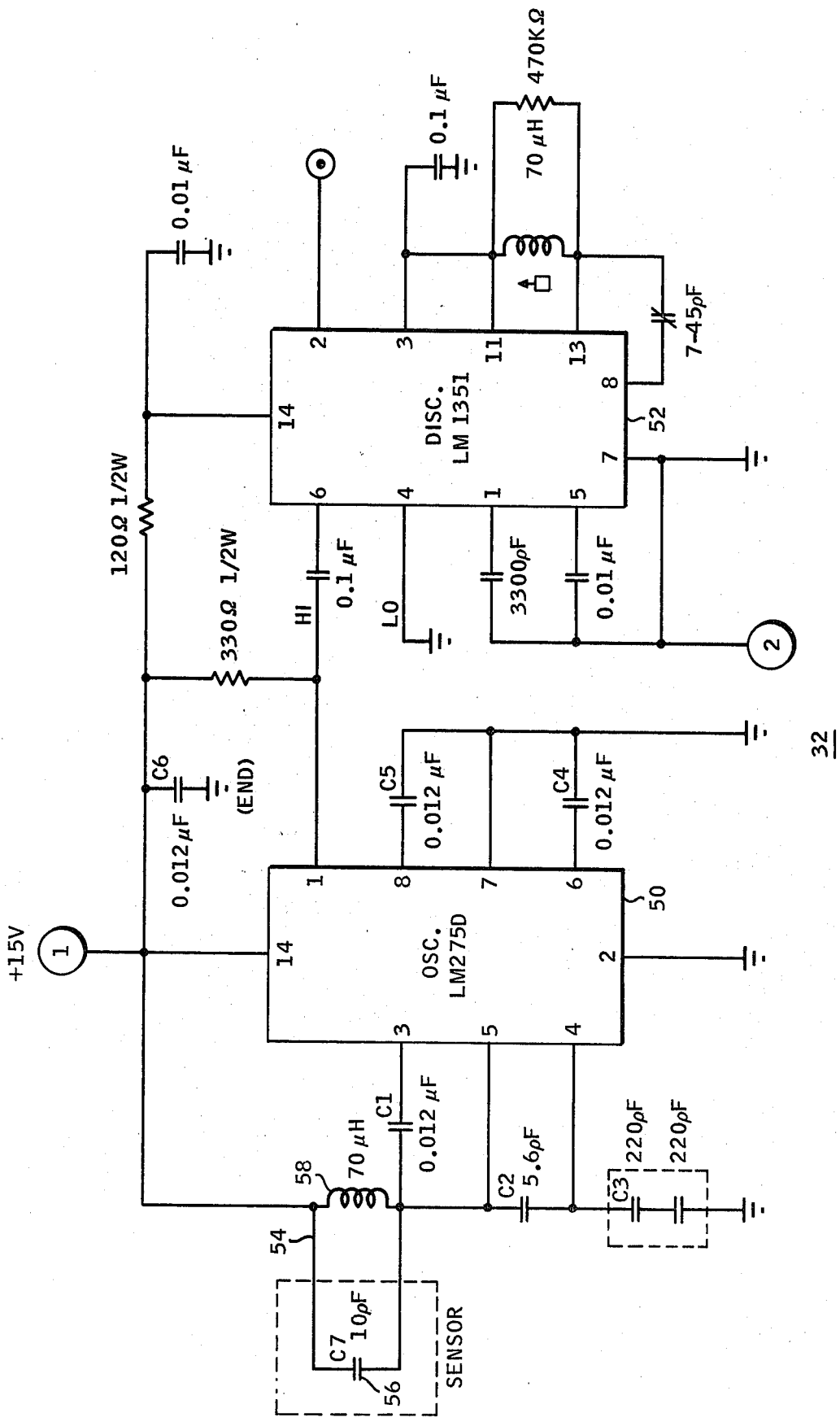
FIG. 3 is an electrical schematic of the non-contact probe assembly seen in the electronic portion in FIG. 1.

Referring now to FIG. 3, the non-contact probe assembly 32 is shown in greater detail. The probe assembly 32 includes an oscillator 50 operating at about 5 mHz. The oscillator 50, by way of example, is a Model LM 2750 manufactured by the National Semiconductor Co. The oscillator 50 is coupled to a frequency discriminator 52 which, by way of example, is a Model LM 1351 manufactured by the National Semiconductor Co. The oscillator 50 is provided with a tuned 54 circuit that includes a capacitor 56 and an inductor 58. As the adjustable means 34 advances the capacitor 56 of the probe assembly 32 toward the conductive surface 12, the equivalent capacitance increases causing the frequency of the oscillator to decrease. This decrease in frequency is translated into a voltage swing at the output of the discriminator 52 which is connected to the interface electronics 40. In the interface electronics 40, the voltage swing is compared to an adjustable reference (gap distance adjustment) and the difference signal amplified and applied to a digital interface circuit within the interface electronics 40. This digital signal indicates whether the probe assembly 32 has been advanced to a predetermined distance from the conductive surface 12. When the probe assembly 32 has reached the predetermined distance, the stepper motor 38 is stopped and the number of stepper motor steps, as counted by the control and display the electronics 44, is directly related to the position of the probe assembly 32.

Having described, thus far, the construction of the non-contacting measurement system of the present invention, its operation and the novel method will now be described in detail. Once the conductive surface 12 has been positioned on the supports 16, a predetermined gap distance is selected to determine the distance from the conductive surface 12 to which the probe assembly 32 will be advanced, which for example may be 0.02 inch to 0.1 inch. The probe 32 is positioned over a predetermined point in the surface 12 or with respect to the fixed initial point 22 on member 20 positioned adjacent to the surface 12. The operator of the system 12 through controls 60 commands the probe 32 to move forward toward the surface 12.

Each stepper motor pulse, in the present example, moves the probe 32 through the precision lead screw 36 exactly 0.0005 inches toward the surface 12. A train of pulses causes the motor 38 to advance the probe 32 forward toward the conductive surface until the probe 32 senses the test surface 12 and generates a "near" signal, as previously described in the description of FIG. 3, indicating the probe 32 has reached the predetermined gap distance separating the probe assembly 32 from the conductive surface 12 at which point the control electronics 42 disables the stepper motor 38 by halting the flow of pulses to it.

The counter and display electronics 44 counts the pulses required to position the probe 32 and displays them for the operator and provides the data to the digital tape unit 46 as desired. The operator then commands the probe 32 through controls 60 to reverse to the original starting position and it moves back a predetermined number of counts. Once the probe assembly 32 has been moved back the predetermined number of counts to its original position, the operator can then move the support arm 30 to a different position to position the probe assembly 32 over a different spot in the conductive surface 12.

The aforementioned measurement cycle is then repeated. The difference between the first display reading and the second and subsequent measurements is the difference in physical length between the initial surface point of measurement and the reference point 14 and the subsequent surface points of measurement and the reference point 14. As many measurements are taken as may be necessary to accurately determine the contour of the surface 12 for the purpose for which it may be desired. The digital tape unit 45 provides a means for recording the data generated in discrete for later computer analysis of a test surface 12.

Although a single fixed reference point 14 has been illustrated, the reference point 14 may be positioned on a predetermined surface in order to measure different contours. Also, the movement of the support arm to different positions and the handling of the data may be further automated as needed for other applications. The travel of the lead screw may be limited and an interlock provided to stop the probe 32 should it inadvertently touch the surface 12.

Many changes may be made in details of the instant invention, in the methods and materials of fabrication, in the configuration and assemblage of the constituent elements, without departing from the spirit and scope of the appended claims which changes are intended to be embraced therein.

Having thus described the invention, what is claimed as new and useful and desired to be secured by United States Letters Patent is:

1. A non-contact measurement system for determining the contour of an electrically conductive surface relative to a fixed reference point comprising:

a support arm journaled at one end to a bearing providing a fixed reference point and adapted to extend toward a first surface having a contour to be determined;

a second separate initial surface is established adjacent to, but separate from the first surface, the contour of which is to be determined whereby a reference length is determined between said fixed reference point and second initial surface without reference to said first surface;

a non-contact probe means coupled to the support arm by an adjustable means adapted to move said probe means either toward or away from said first surface, the contour of which is to be determined or said second surface, and which generates an electrical indication of its axial distance from said fixed reference point, the axial distance from said second surface providing said reference length;

electrical means coupled to said non-contact means to display the distance symbolized by the electrical signal; and control means coupled to said adjustable means and operable to direct the probe means to extend toward the first surface until it reaches a predetermined distance from the surface;

whereby the length of the axial distance traveled by said probe from the fixed reference point to said predetermined distance from the first surface having the contour to be determined is compared with said reference length to determine said contour.

2. The non-contact measurement system as defined in claim 1 wherein the support arm comprises a longitudinally extending member journaled at one end by a fixed spherical bearing.

3. The non-contact measurement system as defined in claim 2 wherein said adjustable means comprises an electrically driven stepper motor secured to said member at the end opposing the journaled end and adapted to position the probe means axially along the longitudinal axis of said member by a lead screw connected to said probe means.

4. The non-contact measurement system as defined in claim 3 wherein said electrical means includes a counter adapted to display a value representative of the distance the probe means is moved toward or away from an initial reference point.

5. The non-contact measurement system as defined in claim 4 wherein the non-contact probe means comprises an oscillator coupled to a frequency discriminator, the oscillator having a tuned circuit including a capacitor which acts as the sensing element when relative to said first or second surface.

6. The non-contact measurement system as defined in claim 5 wherein as the control means causes the probe means to extend toward one of said surfaces from said fixed reference point the equivalent capacities of the tuned circuit increases thereby causing the oscillator frequency to decrease, a decrease in frequency being compared by said electrical means to a reference value until they are substantially the same, at which time the electrical signal generated by the probe means symbolizes the distance the probe means has been moved away from said fixed reference point.

7. The non-contact measurement system as defined in claim 1 wherein said bearing is positionable in a plurality of positions relative to the contour of said first surface.

8. A method for measuring without contact the contour of an electrically conductive surface relative to a fixed reference point comprising:

establishing a fixed reference point relative to the contour of said surface;

positioning an electrical probe means at a fixed distance between the fixed point and a point on said surface and generating a first electrical signal representative of said distance;

extending said probe toward said point along a line extending from said reference point toward the point on the surface until it is positioned a predetermined distance from said surface point and generating a second electrical signal representative of said distance whereby the difference between the first and second electrical signals represents the distance the probe means has moved; and repeating generating the first and second electrical signals in a plurality of positions with respect to said surface thereby generating signals representative of the contour of said surface.

9. The method of claim 8 wherein the first point is measured for distance from the fixed reference point is a point other than a point appearing within the contour of said surface.

10. The method of claim 9 wherein the difference between the first and second electrical signals is expressed in digital form.

* * * * *